Figure 1:
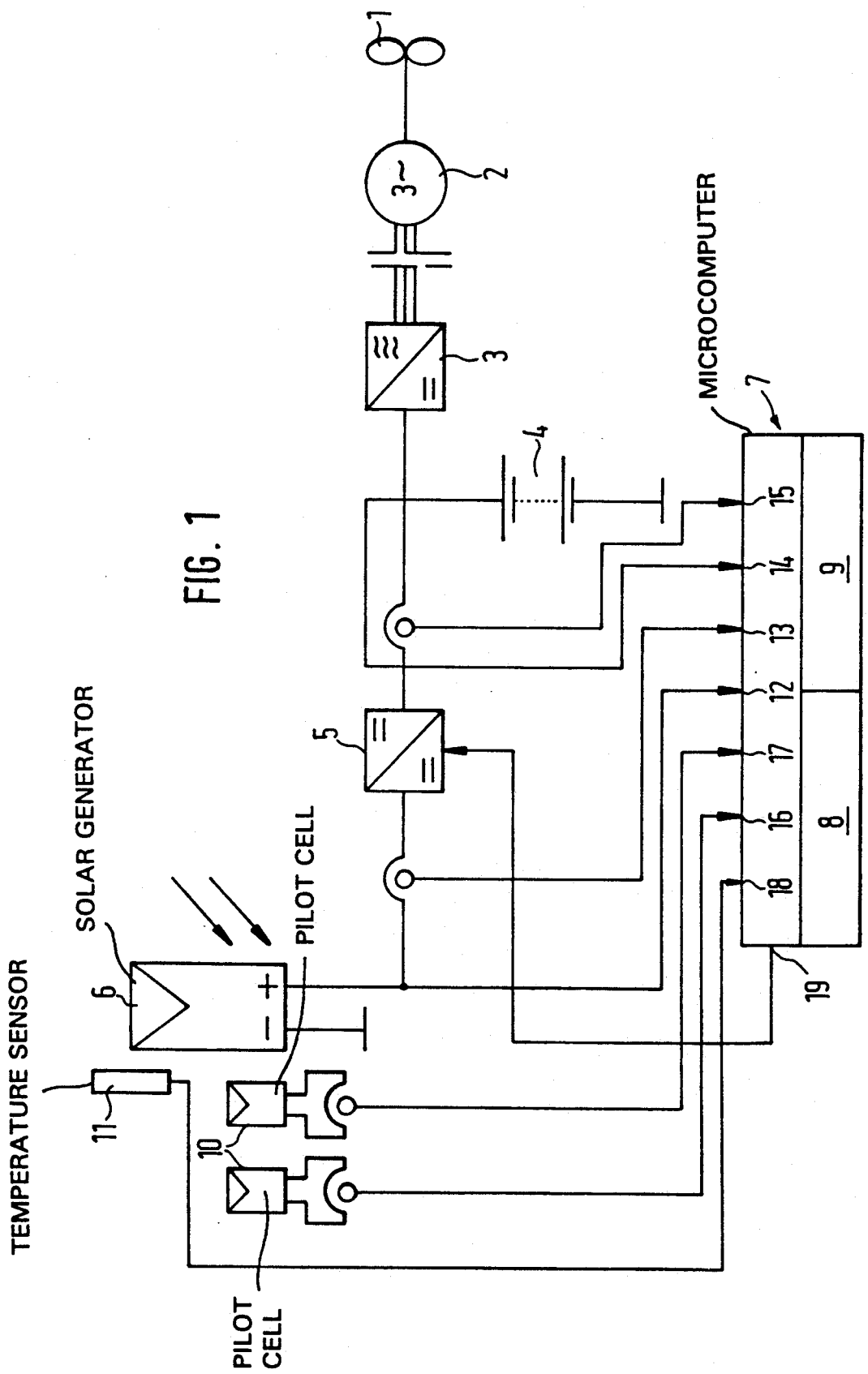

United States Patent [19]
Schaffrin

[11] Patent Number: 5,235,266
[45] Date of Patent: Aug. 10, 1993

[54] ENERGY-GENERATING PLANT, PARTICULARLY PROPELLER-TYPE SHIP'S PROPULSION PLANT, INCLUDING A SOLAR GENERATOR

[75] Inventor: Christian Schaffrin, Konstanz, Fed. Rep. of Germany

[73] Assignee: Schottel-Werft Josef Becker GmbH & Co. KG, Spay/Rhein, Fed. Rep. of Germany

[21] Appl. No.: 804,316

[22] Filed: Nov. 29, 1991

Related U.S. Application Data

[62] Division of Ser. No. 708,670, May 31, 1991, abandoned.

[30] Foreign Application Priority Data

Jun. 2, 1990 [DE] Fed. Rep. of Germany ....... 4017860

[51] Int. Cl.$^5$ ........................................... H01L 31/00
[52] U.S. Cl. ............................ 323/906; 136/293
[58] Field of Search ........... 323/906, 285, 299, 351; 136/293; 320/61; 318/778-801; 363/74, 78, 95, 123, 79, 80; 364/492

[56] References Cited

U.S. PATENT DOCUMENTS

| | | | |
|---|---|---|---|
| 4,375,662 | 3/1983 | Baker | 363/95 |
| 4,390,940 | 6/1983 | Corbefin et al. | 363/132 |
| 4,404,472 | 9/1983 | Steigerwald | 307/46 |
| 4,494,180 | 1/1985 | Streater et al. | 363/37 |
| 4,604,567 | 8/1986 | Chetty | 323/299 |
| 4,661,758 | 4/1987 | Whittaker | 320/21 |
| 4,695,785 | 9/1987 | Meith et al. | 323/222 |
| 4,873,480 | 10/1989 | Lafferty | 323/229 |
| 4,888,702 | 12/1989 | Gerken et al. | 364/494 |
| 4,916,382 | 10/1990 | Kent | 323/299 |
| 4,999,560 | 3/1991 | Morishima et al. | 318/779 |
| 5,001,415 | 3/1991 | Watkinson | 323/906 |
| 5,027,051 | 6/1991 | Lafferty | 323/222 |

*Primary Examiner*—Steven L. Stephan
*Assistant Examiner*—Adolf Berhane
*Attorney, Agent, or Firm*—Fiddler Levine & Mandelbaum

[57] ABSTRACT

An energy-generating plant including a solar generator, having solar cells, for producing electrical energy. The electrical energy is supplied to a direct current converter, the output power of which may be used to charge an energy storage system, such as batteries. The input resistance of the direct current converter is adapted, such as by a microcomputer, to the maximum power point (MPP) of the solar generator, the MPP being dependent upon the solar insolation and the temperature of the solar cells. At start up of the plant, or when there is a change of power at the output of the direct current converter, a search process is carried out to attain the MPP of the solar generator. The energy storage system may be used to energize an electric motor for driving the propeller of a ship.

16 Claims, 2 Drawing Sheets

ENERGY-GENERATING PLANT, PARTICULARLY PROPELLER-TYPE SHIP'S PROPULSION PLANT, INCLUDING A SOLAR GENERATOR

This is a divisional of copending application Ser. No. 07/708,670 filed on May 31, 1991 now abandoned.

This invention relates to an energy-generating plant including a solar generator, the energy-generating plant supplying energy, in particular to a ship's propulsion plant having a propeller and the plant having the characteristics according to the definition of the species of claim 1. In the preferred case, the propeller can be a ship's propeller, which propels the vessel directly, or it may be a turbine wheel of a pump jet, with which the water is accelerated and caused to leave the housing in such a manner that the water jet leaving the housing brings about the propulsion of the vessel. In the latter case, not only can the propulsion of the vessel be brought about, but the direction of travel of the vessel can also be determined by changing the direction of the water jet leaving the housing.

Such propelling systems, to which the invention relates, are generally known and are also in use.

For the generation of energy, the use of solar generators, in which photovoltaic solar cells convert light into electric energy, is also known. If a photovoltaic solar generator is used for propulsion particularly of smaller vessels, attention must be paid to the highest possible efficiency of the components used, in order to keep the area required for the solar generator and the weight of the energy storage system, the motor, and the propulsion system, as small as possible. In other words, a propulsion system should be available which overall has a high efficiency.

Accordingly, it is an object of the invention to provide a photovoltaic energy arrangement which takes maximum electric power from the solar generator guaranteeing thus an optimum energy yield. For this purpose, it is necessary to operate the solar generator at its maximum power point (MPP). This is to be ensured with the invention without having the expense of operating the system at the MPP in an economically unjustifiable manner.

The invention is explained in greater detail below with reference to the drawings.

It is a key feature of the invention to determine the maximum power point as a function of two parameters, namely, "the strength of the solar irradiation" and the "temperature at the solar generator", and to set the conditions for this operating point by means of a computer by adapting the input resistance of a direct current converter for charging an energy storage device for supplying the power to the electric motor of, for example, a ship's propeller. These determining parameters are thereby taken into consideration and, for practical purposes, there is an optimum utilization of the photovoltaics for the propulsion of a vessel.

Figure 2A:
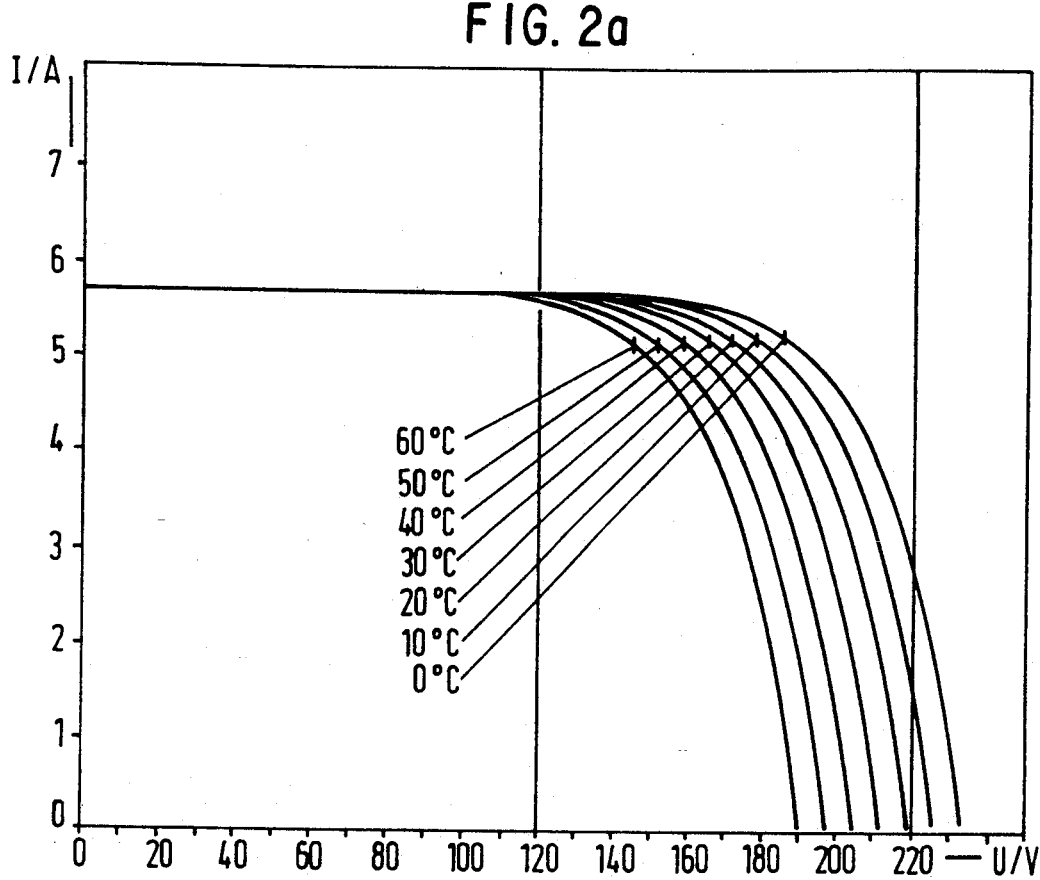
Figure 2B:
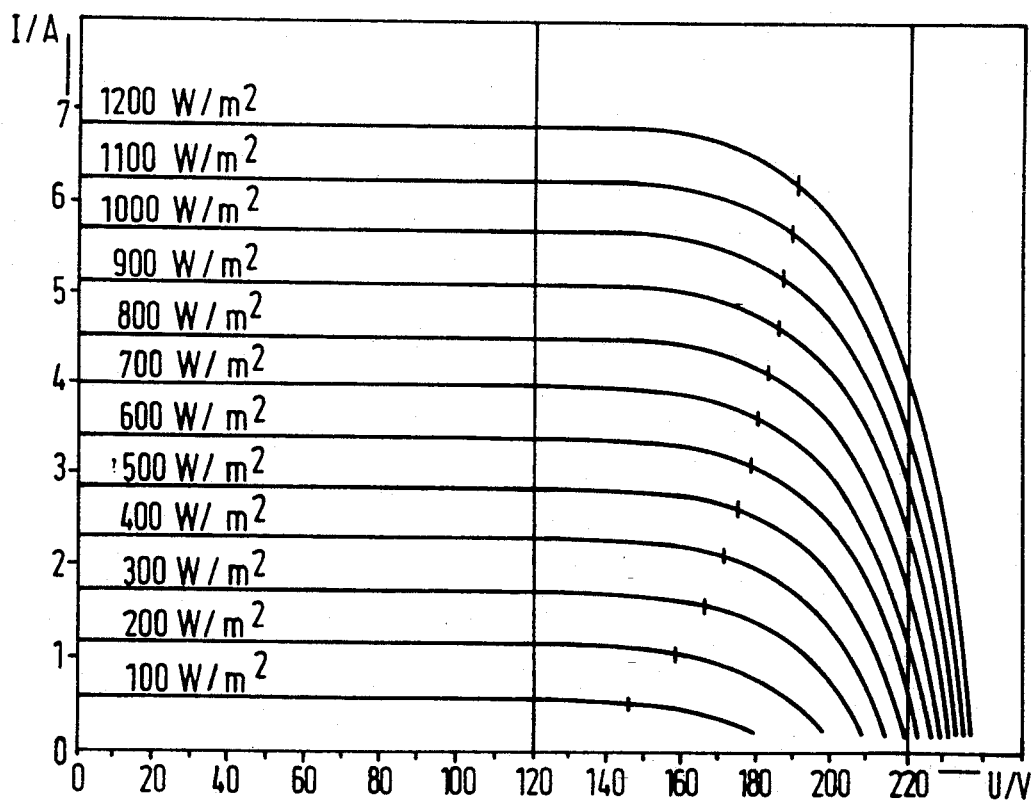

In the drawings, by means of which the invention is described in greater detail:

FIG. 1 is a schematic diagram of the components of a photovoltaic boat propulsion system and for optimum energy management thereof, and FIGS. 2a and 2b indicate the generator characteristics in relation to the working range of the direct current converter, in the form used as a component of the invention. FIG. 2a is a plot showing the effect of variations in temperature of the apparatus of the invention on power output. FIG. 2b is a plot showing the effect of variations in solar irradiation of the apparatus of the invention on power output.

The propulsion system of a vessel (the vessel not being shown) includes a propeller 1, in an individual arrangement, or the propeller 1 as one of several similar propellers, is used. The propeller 1 is fixed on, and rotatable with, the drive shaft of an electric motor 2. Electric energy is supplied to the electric motor 2 from a d.c.-to-a.c. converter 3, which draws electric energy from a number of batteries 4, which serve to store the energy of the system. The batteries 4 are charged with electric energy by means of a direct current converter 5, the electric energy being obtained by means of a solar generator 6 having a plurality of solar cells.

Assigned to this system is a microcomputer 7 and a data field 9, to which are supplied, as input quantities, the generator voltage as signal 12, the generator current as signal 13, the battery voltage as signal 14, the battery charging current as signal 15, the measured values of the pilot cells 10, which serve to measure the solar irradiation as signals 16 and 17, and the measured value of the temperature sensor 11 at the solar generator as signal 18. From the processing of these signals in the microcomputer 7, which contains a data field 9, a control signal 19 is obtained, which is supplied to the direct current converter.

The input resistance of the direct current converter 5 can be freely varied within a particular operating range. The output voltage of the converter follows the voltage of the connected storage battery up to the end of charge. This control input forms the interface with the overriding microcomputer system 7. The microcomputer is supplied with information from different measuring sites in the system.

Due to the nonlinearity of the characteristic of the solar generator 6, which is, in addition, liable to permanent changes, also with respect to its shape, it is not possible to specify a nominal value for the design of a closed control loop with the direct current converter 5 being the electric actuator.

In the propulsion system described hereafter, a control algorithm has to be developed and programmed, which operates the solar generator 6 at the maximum power point, the MPP through successive optimizations. In this system, the voltage and current are measured at the output of the direct current converter 5 and supplied to the microcomputer 7. From these values, the power is calculated, which the direct current converter 5 delivers to the energy storage system 4. This power must be maximized in order to obtain optimum power and hence optimum energy yield of the solar generator 6.

When the system is started up, the value of the control signal is set by the microcomputer 7 to an initial value, as is the input resistance of the direct current converter 5. Since the position of the valid MPP is not known, the values to which the control signal and the input resistance of the direct current converter must be changed, cannot be specified. The value of the control signal is now increased with the largest step width w and the voltage and current are measured again and the power is determined. If the power is greater, the search is in the right direction and the value of the control signal is again increased by the step width w and the voltage and current are measured again. If the power becomes less, the search direction is wrong and the value of the control signal is decreased by the step width w. The voltage and current are measured once more and the calculated power is compared with the specified value.

Due to the large step width w the characteristic of the solar generator is quickly covered. Moreover, the procedure ensures that local maxima, if any, are skipped and the area of the absolute maximum is detected.

If now the operating point has overstepped the MPP, the direction of the search is reversed and the MPP is traversed in the opposite direction. The operating point thus oscillates about the actual MPP. Because of the large step width, the operating point is still relatively far distant from the actual MPP. If now, as described above, the MPP is traversed once in both directions, then the step width w is halved and the optimization is continued. This halving of the step width is continued up to the smallest possible step width. In this way, the operating point is brought as close as possible to the MPP.

At the end of a search process, that is, when the step width is a minimum the searching process is interrupted as long as the power yield remains constant.

The search process remains switched off until the power yield changes by a value to be established, that is, until the position of the MPP has changed. In order to attain an accurate setting of the new MPP as quickly as possible when there have been small changes, the searching process is continued with the smallest step width, only after a predetermined number of search steps in the same direction the step width is doubled, at most to the largest step width w. In order to accelerate the optimization process in the further operation, the MPP values found are filed in a data field. For the identification of the MPP, on the one hand, and the value of the control signal, on the other, the values of the solar irradiation and the generator temperature are required being the determining parameters for the position of the MPP.

The solar irradiation is determined with the help of at least one so-called pilot cell 10. Such a pilot cell is an accurately calibrated reference cell, which is operated in circuit. The short-circuit current is a direct measure of the magnitude of the solar irradiation, which can actually be processed by a photovoltaic solar generator. With respect to the solar radiation the pilot cell is installed in the same position as the solar generator in its immediate vicinity as regards the solar irradiation, so that the same irradiation conditions can be assumed. For reasons of redundancy, it is advisable to use at least two pilot cells 10.

The generator temperature is measured with two temperature sensors 11, which are interrupted within the rear of the solar generator 6 at various places.

These values are also supplied to the microcomputer 7, so that the measured irradiation and temperature of the solar generator can be stated for each operating point.

Each MPP found, an MPP being regarded as found when it was possible to terminate the search process, is filed in the data field. In doing so, the value of the control signal for said MPP is filed in the field element, and the index values for the determination of the field element are the values of the solar irradiation and the generator temperature.

If now the search process is started, or started anew, the microcomputer searches in the created data field for an MPP value which is valid for the instantaneous temperature and solar irradiation, i.e. the control signal value. If it can find such a valid MPP, the value of the control signal is set immediately and the generator is thus operated at the MPP, the searching process can be omitted. If there is no valid MPP value, a search for the MPP must be conducted in the manner described above.

In order to prevent a wrong value being written into the MPP data field due to the shading or partial shading of the solar generator or the pilot cells, a plausibility test is carried out before each entry. On the basis of the family of characteristics of a solar generator and with the short circuit current of the pilot cells and the generator temperatures as input quantities, the anticipated output at the MPP can be calculated with an accuracy of about ±10%. This is too inaccurate for the MPP control, but entirely adequate for a plausibility test.

Before each entry of a supposed MPP into the data field, the actual generator output, calculated from the generator voltage and the generator current, is compared with the anticipated output by means of the previously mentioned calculation. If the actual output deviates by not more than about 10% from the calculated one, the value is plausible and is entered in the data field; if not, the search process is continued.

This plausibility test is also carried out before the value of a control signal is set by means of the tabulated values. This prevents an incorrect operating point being set because of shading of the pilot cell or of the solar generator.

It is evident that the energy, obtained with the help of the plant described and stored in the batteries 4, can serve not only for the propulsion of a propeller 1 serving for the propulsion of a ship, although being derived in particular from the object of the invention. The invention can also find application in conjunction with a land-based plant. In such a case, the d.c.-to-a.c. converter 3 is not coupled to the electric motor 2 of the propeller 1, but the power produced is fed, for example, into an electrical grid instead of to the batteries 4. For example, a consumer, who is not connected to the electrical grid, is supplied with electricity, the installation operating rationally, because it always works at the maximum power point with respect to the practical requirements.

I claim:

1. In an energy-generating plant having solar cell means for converting solar energy to electrical energy, electrical storage means for storing the electrical energy generated by the solar cell, and energy conversion means having an input operatively connected to the solar cell means and an output operatively connected to the electrical storage means for storing the electrical energy generated by the solar cell means in the storage means, the improvement which comprises, control means operatively connected to the energy conversion means for varying a characteristic of the energy conversion means to optimize its power output;

sensor means for measuring the magnitude of at least one environmental characteristic to which the solar cell means is exposed; and data storage means having first input means operatively connected to the output of the energy conversion means, and second input means operatively connected to the sensor means, for storing in one to one correspondence, environmental characteristic magnitudes measured by the sensor means with respective settings of the control means at which the power output is optimized, and matching means for comparing the current magnitude of the environmental characteristic measured by the sensor means to the magnitudes of the environmental characteristic stored in the data storage means, the control means being connected to the matching means for being adjusted to the respective setting stored in the data storage means corresponding to a matched stored magnitude of the environmental characteristic.

2. Apparatus according to claim 1 wherein the environmental characteristic is a function of the solar irradiation to which the solar cell means is exposed.

3. Apparatus according to claim 1 wherein the environmental characteristic is a function of the temperature of the solar cell means.

4. Apparatus according to claim 1 wherein the control means setting is varied in magnitude and direction, until the power output is at a maximum.

5. Apparatus according to claim 4 wherein the direction of adjustment of the control means setting is reversed in response to a decrease in power output.

6. Apparatus according to claim 5 wherein the magnitude of the increment of adjustment of the control means setting is halved upon every other change in direction of the control means setting until a predetermined minimum magnitude for the increment is reached.

7. Apparatus according to claim 1 wherein the data storage means stores environmental characteristic magnitudes with respective settings of the control means only in response to an indication from the matching means that there is no match between the magnitude of the measured environmental characteristic and the magnitude of any previously stored environmental characteristic.

8. Apparatus according to claim 7, further comprising plausibility testing means for comparing the magnitude of the measured environmental characteristic and the corresponding maximum power with previously stored lesser and greater magnitudes of the environmental characteristic and their respective stored maximum powers, and for storing the magnitude of the current measured environmental characteristic and corresponding maximum power only if they are between the respective previously stored magnitudes.

9. Apparatus according to claim 1 further comprising an electric motor operatively connected to the electrical storage means for being driven thereby, and
a propeller mounted on the motor to form a solar powered propulsion system.

10. A method of adjusting a characteristic of an energy conversion means to optimize the power delivered from a solar cell generator to an electrical storage device comprising,
measuring the magnitude of at least one environmental characteristic to which the solar cell generator is exposed and the power produced at the output of the energy conversion means while varying the magnitude of the characteristic of the energy conversion means until the maximum power point is reached,
for each magnitude of the environmental characteristic to which the solar cell generator is exposed, storing in one to one correspondence, the magnitude of the measured environmental characteristic, a magnitude related to the characteristic of the energy conversion means, and the power at the output of the energy conversion means, and
in response to a change in the environmental characteristic to which the solar cell generator is exposed, comparing the current magnitude of the environmental characteristic measured by the sensor means to the stored magnitudes of the environmental characteristic, and upon finding a match between the current magnitude of the environmental characteristic measured by the sensor means and a stored magnitude of the environmental characteristic, adjusting the magnitude of the characteristic of the energy conversion means to the stored magnitude corresponding to the current magnitude of the environmental characteristic.

11. A method according to claim 10 wherein the environmental characteristic is a function of the solar irradiation to which the solar cell generator is exposed.

12. A method according to claim 10 wherein the environmental characteristic is a function of the temperature of the solar cell generator.

13. A method according to claim 10 wherein the direction of adjustment of the control means is reversed in response to a measured decrease in power output.

14. A method according to claim 13 wherein the magnitude of the increment of adjustment of the control means is halved upon every other change in direction of the control means until a predetermined minimum magnitude for the increment is reached.

15. A method according to claim 10 wherein the current environmental characteristic magnitude is stored with its respective setting of the control means only when the magnitude of the measured environmental characteristic has not been previously stored.

16. A method according to claim 10 further comprising comparing the magnitude of the measured environmental characteristic and the corresponding maximum power with previously stored higher and lower magnitudes of the environmental characteristic and their corresponding maximum powers and storing the magnitude of the current environmental characteristic and corresponding maximum power only if they are between the previously stored magnitudes.

* * * * *